United States Patent
Takemura

(10) Patent No.: US 12,458,733 B2
(45) Date of Patent: Nov. 4, 2025

(54) MEDICAL DEVICE AND METHOD FOR PRODUCING MEDICAL DEVICE

(71) Applicant: TERUMO KABUSHIKI KAISHA, Tokyo (JP)

(72) Inventor: Naoto Takemura, Atsugi (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 706 days.

(21) Appl. No.: 17/701,619

(22) Filed: Mar. 22, 2022

(65) Prior Publication Data

US 2022/0211916 A1   Jul. 7, 2022

Related U.S. Application Data

(63) Continuation of application No. PCT/JP2020/030405, filed on Aug. 7, 2020.

(30) Foreign Application Priority Data

Sep. 26, 2019 (JP) ................. 2019-176153

(51) Int. Cl.
| | |
|---|---|
| A61K 31/14 | (2006.01) |
| A61K 31/496 | (2006.01) |
| A61K 31/65 | (2006.01) |
| A61K 31/727 | (2006.01) |
| A61L 27/14 | (2006.01) |

(Continued)

(52) U.S. Cl.
CPC .............. *A61L 29/08* (2013.01); *A61K 31/14* (2013.01); *A61K 31/496* (2013.01); *A61K 31/65* (2013.01); *A61K 31/727* (2013.01); *A61L 27/14* (2013.01); *A61L 27/34* (2013.01); *A61L 29/16* (2013.01);
(Continued)

(58) Field of Classification Search
CPC .......... A61L 29/08; A61L 27/14; A61L 27/34; A61L 29/16; A61L 31/10; A61L 31/16; A61L 2300/206; A61L 2300/404; A61L 2300/406; A61L 29/085; A61K 31/14; A61K 31/496; A61K 31/65; A61K 31/727; A61M 5/32; A61M 25/09; A61M 25/0009; A61M 2025/0056; A61M 2025/09133; A61M 2207/10
See application file for complete search history.

(56) References Cited

U.S. PATENT DOCUMENTS

| | | | | |
|---|---|---|---|---|
| 4,925,668 A | * | 5/1990 | Khan ...................... | A61L 29/16 523/112 |
| 4,952,419 A | * | 8/1990 | De Leon ................ | A61L 27/54 623/901 |

(Continued)

FOREIGN PATENT DOCUMENTS

| | | |
|---|---|---|
| JP | S61-35870 B2 | 8/1986 |
| JP | H02-234764 A | 9/1990 |

(Continued)

OTHER PUBLICATIONS

Phuengkham et al. (J Mater Sci Med 2015;26:11 pages). (Year: 2015).*

(Continued)

*Primary Examiner* — Ernst V Arnold
(74) *Attorney, Agent, or Firm* — Foley & Lardner LLP

(57) ABSTRACT

A medical device includes a mottled structure containing silicone and an antibacterial agent at a surface of the medical device.

8 Claims, 1 Drawing Sheet

EXAMPLE 1

EXAMPLE 2

EXAMPLE 3

EXAMPLE 4

(51) Int. Cl.

| | | |
|---|---|---|
| *A61L 27/34* | (2006.01) | |
| *A61L 29/08* | (2006.01) | |
| *A61L 29/12* | (2006.01) | |
| *A61L 29/16* | (2006.01) | |
| *A61L 31/10* | (2006.01) | |
| *A61M 5/32* | (2006.01) | |
| *A61M 25/00* | (2006.01) | |
| *A61M 25/09* | (2006.01) | |

(52) U.S. Cl.
CPC ............... *A61L 31/10* (2013.01); *A61M 5/32* (2013.01); *A61M 25/09* (2013.01)

(56) References Cited

U.S. PATENT DOCUMENTS

| | | | | |
|---|---|---|---|---|
| 2007/0299402 | A1* | 12/2007 | Ishii | ............ A61L 27/34 525/477 |
| 2012/0330210 | A1* | 12/2012 | Yang | ............ A61K 45/06 424/618 |
| 2017/0130096 | A1 | 5/2017 | Grunlan et al. | |

FOREIGN PATENT DOCUMENTS

| | | | | |
|---|---|---|---|---|
| JP | 2003522553 A | * | 7/2003 | ............ A61L 31/16 |
| JP | 2008-000287 A | | 1/2008 | |
| JP | 2013-146504 A | | 8/2013 | |
| JP | 2013-192885 A | | 9/2013 | |
| JP | 2014-200974 A | | 10/2014 | |
| JP | 2018-023758 A | | 2/2018 | |
| WO | WO-93/17746 A1 | | 9/1993 | |
| WO | WO-99/18891 A1 | | 4/1999 | |
| WO | WO-2008/148786 A1 | | 12/2008 | |
| WO | WO-2011/041546 A1 | | 4/2011 | |
| WO | WO-2017/145842 A1 | | 8/2017 | |

OTHER PUBLICATIONS

Kallmes et al. (AJNR Am J Neuroradiol 1997, 18 (7) 1243-1251) (Year: 1997).*

English translation of JP2003522553A; 2003: 18 pages. (Year: 2003).*

International Searching Authority, "International Search Report," issued in connection with International Patent Application No. PCT/JP2020/030405, dated Oct. 6, 2020.

International Searching Authority, "Written Opinion," issued in connection with International Patent Application No. PCT/JP2020/030405, dated Oct. 6, 2020.

International Searching Authority, "Written Opinion," issued in PCT Application No. PCT/JP2020/030405, dated Oct. 6, 2020 with English translation.

* cited by examiner

EXAMPLE 1
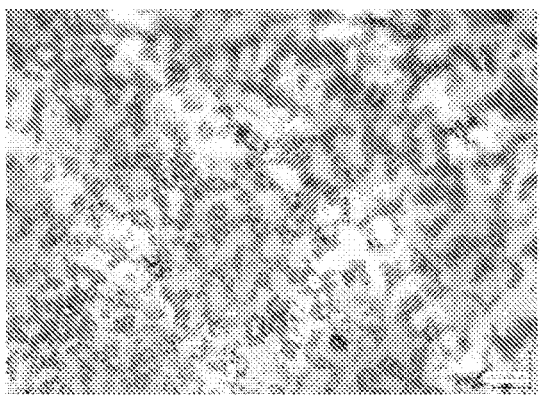
EXAMPLE 2
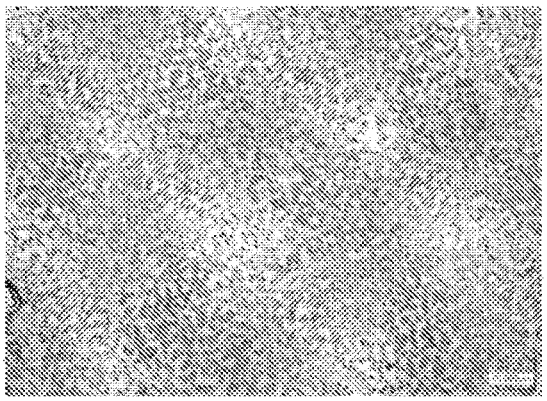
EXAMPLE 3
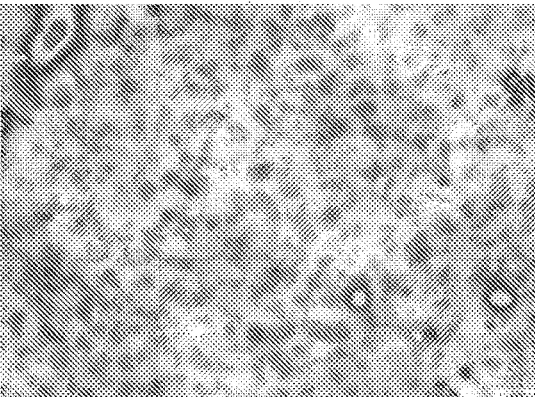
EXAMPLE 4
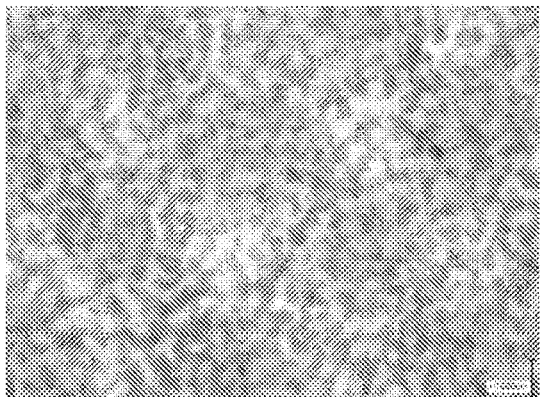

MEDICAL DEVICE AND METHOD FOR PRODUCING MEDICAL DEVICE

CROSS-REFERENCE TO RELATED APPLICATIONS

This application is a bypass continuation of PCT Application No. PCT/JP2020/030405, filed on Aug. 7, 2020, which claims priority to Japanese Patent Application No. 2019-176153, filed on Sep. 26, 2019. The contents of these applications are hereby incorporated by reference in their entireties.

BACKGROUND

The present disclosure relates to a medical device and a method for producing the medical device.

Medical devices inserted into a living body, such as a catheter and an indwelling needle, are used for infusion, blood transfusion, and the like. As such a medical device, a medical device whose surface is treated with silicone in order to impart lubricity and reduce friction at the time of puncture is known. For example, JP S61-35870 B discloses an injection needle surface-treated with a composition containing, as a main component, a reaction product between a reaction product of an amino group-containing silane and an epoxy group-containing silane, and a polydiorganosiloxane containing a silanol group.

SUMMARY

The injection needle described in JP S61-35870 B certainly has an excellent puncture property due to its surface coated with silicone.

However, in addition to an excellent puncture property, a medical device inserted into a living body is required to have an antibacterial property in addition to an excellent puncture property.

Therefore, certain embodiments of the present invention have been developed in view of the above circumstances, and an object of certain embodiments of the present invention is to provide a medical device having an excellent sliding property (in particular, a puncture property) and having an excellent antibacterial property.

The present inventor has conducted intensive studies in order to solve the above problem. As a result, the present inventor has found that the above problem may be solved by a medical device having a mottled structure containing silicone and an antibacterial agent on a surface thereof.

BRIEF DESCRIPTION OF THE DRAWINGS

The FIGURE is a laser micrograph showing the surface structure of a catheter of Examples.

DETAILED DESCRIPTION

Hereinafter, embodiments of the present invention will be described. However, the present invention is not limited only to the following embodiments.

In the present specification, "X to Y" indicating a range means "X or more and Y or less." In addition, unless otherwise specified, operations and measurements of physical properties and the like are performed under the conditions of a room temperature of 25±1° C./a relative humidity of 40 to 50% RH.

<Medical Device>

According to one embodiment of the present disclosure, a medical device has a mottled structure containing silicone and an antibacterial agent on a surface thereof. When the medical device has a mottled structure containing silicone and an antibacterial agent on a surface thereof, the medical device can have an excellent sliding property (in particular, a puncture property) and exhibit an excellent antibacterial property.

In the present specification, the "surface" of the medical device refers to a surface of a material constituting the medical device with which blood or the like comes into contact when the medical device is used, and a surface portion of a cavity in the material. For example, when the medical device is an indwelling catheter, the surface means an outer surface and/or an inner surface.

(Silicone)

The silicone according to the present embodiment is not particularly limited, and biocompatible silicone can be appropriately used. As the silicone, a crosslinked silicone is preferably used from the viewpoint of form stability.

The crosslinked silicone is a silicone containing a three-dimensional bond. Specific examples of the crosslinked silicone include a reaction product between a reaction product of an amino group-containing silane and an epoxy group-containing silane, and a polydiorganosiloxane containing a silanol group described in JP S61-35870 B or JP S62-52796 B, and a copolymer of aminoalkylsiloxane and dimethylsiloxane described in JP S46-3627 B.

Examples of the amino group-containing silane include γ-aminopropyltriethoxysilane, γ-aminopropylmethyldiethoxysilane, N-(β-aminoethyl)aminomethyltrimethoxysilane, γ-(β-aminoethyl)aminopropyltrimethoxysilane, γ-(N-(β-aminoethyl)amino)propylmethyldimethoxysilane, N-(β-aminoethyl)aminomethyltributoxysilane, and γ-(N-(β-(N-(β-aminoethyl)amino)ethyl)amino) propyltrimethoxysilane.

Examples of the epoxy group-containing silane include γ-glycidoxypropyltrimethoxysilane, γ-glycidoxypropylmethyldimethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, and β-(3,4-epoxycyclohexyl)ethylmethyldiethoxysilane.

The polydiorganosiloxane containing a silanol group has at least one silanol group in one molecule. The viscosity of the polydiorganosiloxane containing a silanol group is in a range of 0.00002 to 1 $m^2/s$, and preferably 0.0001 to 0.1 $m^2/s$ at 25° C. When the viscosity is 0.00002 $m^2/s$ or more, a sufficient puncture property can be obtained. When the viscosity is 1 $m^2/s$ or less, handling before curing is facilitated. Examples of the organic group bonded to the silicon atom of the silanol group include an alkyl group such as a methyl group, a phenyl group, and a vinyl group. From the viewpoint of ease of synthesis of polydiorganosiloxane, the organic group is preferably a methyl group or a phenyl group, and more preferably a methyl group. Specific examples of the polydiorganosiloxane containing a silanol group include polydimethylsiloxane in which one terminal is blocked with a silanol group and the other terminal is blocked with a trimethylsilyl group, polydimethylsiloxane in which both terminals are blocked with a silanol group, and polymethylphenylsiloxane in which both terminals are blocked with a silanol group.

The reaction product of an amino group-containing silane and an epoxy group-containing silane can be obtained by reacting the amino group-containing silane and the epoxy group-containing silane by heating with stirring.

For the reaction ratio between the amino group-containing silane and the epoxy group-containing silane, the ratio of the epoxy group-containing silane is in a range of 0.5 to 3.0 mol, and preferably 0.75 to 1.5 mol with respect to 1 mol of the amino group-containing silane.

The reaction product between the reaction product (A component) of the amino group-containing silane and the epoxy group-containing silane, and the polydiorganosiloxane containing a silanol group (B component) can be obtained by reacting the A component and the B component while heating using a solvent as necessary. For the blending ratio between the A component and the B component, the blending ratio of the A component is in a range 0.1 to 10 mass %, and the blending ratio of the B component is in a range 90 to 99.9 mass %, with respect to the total of the A component and the B component. Preferably, the blending ratio of the A component is in a range 1 to 5 mass %, and the blending ratio of the B component is in a range 95 to 99 mass %.

As the crosslinked silicone, a commercially available product can be used. Examples of a commercially available product that can be used include MDX4-4159 (manufactured by The Dow Chemical Company).

The silicone may be used singly or in combination of two or more types thereof.

(Antibacterial Agent)

The antibacterial agent according to the present embodiment is not particularly limited as long as it is a fat-soluble or water-soluble antibacterial agent used in the field of medical devices. Examples thereof include organic antibacterial agents and natural antibacterial agents, and an organic antibacterial agent is preferable.

Examples of the organic antibacterial agent include chlorhexidine acetate, chlorhexidine digluconate, chlorhexidine dihydrochloride, chlorhexidine diphosphanilate, alexidine, polyaminopropyl biguanide, polyhexanide, rifampin, minocycline hydrochloride, benzalkonium, benzalkonium heparin, benzalkonium chloride, tridodecylmethylammonium chloride, didecyldimethylammonium chloride, chloroallylhexaminium chloride, benzethonium chloride, methylbenzethonium chloride, cetyltrimethylammonium bromide, cetylpyridinium chloride, dioctyldimethylammonium chloride, or other amine-based, alcohol-based, aldehyde-based, isothiazolone-based, imidazole-based, ester-based, chlorine-based, oxide-based, sulfide-based, sulfamide-based, tetraammonium salt-based, nitrile-based, biguanide-based, pyridine-based, phenol-based, phthalimide-based, and iodine-based organic antibacterial agents.

Examples of the natural antibacterial agent include protamine, ε-polylysine, lysozyme, spice extract, and tree extract.

In a preferred embodiment, the antibacterial agent is selected from chlorhexidine acetate, rifampin, benzalkonium heparin, and minocycline hydrochloride from the viewpoint of further exhibiting the effect of the present invention.

The antibacterial agent may be used singly or in combination of two or more types thereof.

The mass ratio (silicone:antibacterial agent) of the silicone (total amount when two or more types of silicones are used) and the antibacterial agent (total amount when two or more types of antibacterial agents are used) contained in the mottled structure according to the present embodiment is preferably in a range 1:0.01 to 1, and more preferably 1:0.05 to 0.2 from the viewpoint of further exhibiting the effect of the present invention.

(Mottled Structure)

In the invention according to the present embodiment, the surface of the medical device is configured with a mottled structure. The surface of the medical device is formed in an uneven shape. That is, in an embodiment, the mottled structure includes a convex portion formed on the surface and a concave portion formed on the surface. The convex portion formed on the surface contains silicone and an antibacterial agent. The concave portion formed on the surface is not substantially covered, and the surface of the substrate is exposed. The convex portion has a portion in which a plurality of granular projections are randomly connected to form a meandering linear body in a plan view. The concave portion surrounds the convex portion in a plan view so that the linear bodies of the convex portion are arranged in a relatively dispersed manner. Such a state in which the convex portion and the concave portion are irregular is referred to as a mottled pattern. The mottled structure can be confirmed by observation with a laser microscope (objective lens: 150 times).

The FIGURE is an image showing an example of a mottled structure of the present embodiment, and is a laser micrograph of a surface of catheters of Examples 1 to 4 described later. The dark color portion corresponds to the convex portion, and the light color portion corresponds to the concave portion. The dark color portion corresponding to the convex portion extends in a random direction and is continuous with another portion, and is connected at a plurality of sites. The light color concave portion surrounds the convex portion and is continuous with another concave portion. The surface of the medical device is in a state in which the convex portion and the concave portion are irregular as described above. A structure in which the dark color portion is connected to the other portion at a plurality of sites can also be expressed as a mesh structure. In addition, the dark color portion corresponding to the convex portion extends linearly, but there is also a portion where the dark color portion is dispersed alone. The light color concave portion surrounds the convex portion and is continuous with another concave portion.

It can be confirmed by elemental analysis, FT-IR, or the like that the convex portion contains silicone and an antibacterial agent.

When the surface of the substrate has a mottled structure containing silicone and an antibacterial agent, the medical device of the present embodiment can have an excellent sliding property (in particular, a puncture property) and exhibit an excellent antibacterial property.

It is considered that the silicone and the antibacterial agent form a mottled pattern with an appropriate size and distribution on the surface of the substrate, whereby a sliding property and an antibacterial property can be exhibited. The mechanism by which the silicone and the antibacterial agent form a mottled pattern is considered to be related to the interaction of the substrate with the silicone and the antibacterial agent.

In a preferred embodiment, the average convex width (width of the convex portion) of the mottled structure is preferably in a range 0.1 to 10 µm, and more preferably 0.5 to 5 µm from the viewpoint that the effect of the present invention can be further exhibited. The average concave width (width of the concave portion) of the mottled structure is preferably in a range 0.1 to 10 µm, and more preferably 0.5 to 5 µm.

In a preferred embodiment, the ratio of the average convex width to the average concave width (average convex width/average concave width) of the mottled structure is preferably in a range 0.1 to 5, more preferably 0.3 to 3, and still more preferably 0.4 to 2 from the viewpoint that the effect of the present invention can be further exhibited.

The average convex width and the average concave width of the mottled structure can be measured by the following method.

First, the surface of the medical device having a mottled structure is observed with a laser microscope (VKX-100, manufactured by Keyence Corporation, objective lens: 150 times, monitor magnification: 3,000 times), and an image is captured. The captured image is analyzed with image analysis software. Specifically, an optional straight line (first straight line) is drawn on the image, and a second straight line orthogonal to the first straight line is drawn. A portion of the convex portion intersecting each straight line is defined as a convex width, and a portion of the concave portion intersecting each straight line is defined as a concave width. The average convex width is obtained by arithmetically averaging the convex widths obtained from at least nine points. The average concave width is obtained by taking the concave widths from at least nine points and arithmetically averaging the obtained concave widths. The convex width a and the concave width b are measured values in the X direction, and the convex width a' and the concave width b' are measured values in the Y direction. When b is smaller than b', the convex width a and the concave width b are adopted, and when b is larger than b', the convex width a' and the concave width b' are adopted.

(Other components) The mottled structure according to the present embodiment can further contain components other than silicone and an antibacterial agent. Examples of the other component include hydrophilic polymers such as polyethylene glycol and polymethoxyethyl acrylate (PMEA) that can be dissolved in a solvent common to both silicone and an antibacterial agent, or organic compounds having a pharmacological action.

When polyethylene glycol is used, the weight average molecular weight of polyethylene glycol is, for example, in a range of 100 to 10,000,000, preferably 200 to 4,000,000, and more preferably 400 to 500,000. As the weight average molecular weight, a value measured by gel permeation chromatography (Gel Permeation Chromatography, GPC) using polystyrene as a standard substance and tetrahydrofuran (THF) as a mobile phase is adopted.

(Medical Device)

Examples of the medical device of the present embodiment include a device used in contact with body fluid, blood, or the like. As described above, when the surface of the medical device has a mottled structure containing silicone and an antibacterial agent, the medical device can have an excellent sliding property (in particular, a puncture property) and exhibit an excellent antibacterial property. Therefore, the medical device of the present embodiment may be used in any application as long as a puncture property and/or an antibacterial property are required. Examples include a catheter, a sheath, a cannula, a needle, a three-way stopcock, and a guide wire. Other examples include a blood circuit, an artificial dialyzer, an artificial (auxiliary) heart, an artificial lung, an indwelling needle, an artificial kidney, and a stent. In the case of a medical device inserted into or indwelled in a body cavity such as a blood vessel, the above-described structure can be provided on the outer surface of at least only a part of the device in order to improve a sliding property when the medical device comes into contact with the body cavity. In the case of a medical device in which a second device is inserted into the internal space thereof, such as a catheter or a sheath, the above structure can be provided on at least only a part of the surface of the internal space in order to improve a sliding property when the second device is inserted. In particular, the medical device of the present embodiment can achieve both a sliding property, particularly a puncture property and an antibacterial property, and thus is suitably used as an indwelling catheter.

<Method for Producing Medical Device>

The medical device according to the above embodiment has a mottled structure containing silicone and an antibacterial agent on a surface thereof. Here, the method for producing the medical device is not particularly limited, but it is preferable to coat a substrate with a mixed solution containing silicone and an antibacterial agent to form a mottled structure containing silicone and an antibacterial agent on the surface of the substrate.

Therefore, according to another embodiment of the present invention, a method for producing a medical device includes coating a substrate with a mixed solution containing silicone and an antibacterial agent to form a mottled structure containing silicone and an antibacterial agent on a surface of the substrate.

(Mixed Solution)

The silicone and the antibacterial agent are similar to those in the form of the medical device, described above, and thus the description thereof is omitted.

The method for preparing the mixed solution is not particularly limited, and for example, the mixed solution can be prepared by dissolving silicone and an antibacterial agent in a solvent. The solvent is not particularly limited as long as it can dissolve silicone, an antibacterial agent, and other components as necessary. For example, dichloropentafluoropropane, methylene chloride, hydrochlorofluoroolefin, trans-1,2-dichloroethylene, chloroform, or the like can be used as a solvent for the crosslinked silicone and an antibacterial agent such as chlorhexidine acetate, rifampin, benzalkonium heparin, or minocycline hydrochloride. In order to enhance the solubility in the antibacterial agent, an alcohol such as methanol, ethanol, or isopropyl alcohol or other substances may be added to these solvents.

The concentration of the silicone in the mixed solution is not particularly limited as long as it is a concentration that allows formation of a mottled structure on the surface of the substrate, and is, for example, in a range of 0.1 to 20 w/v %, and preferably 1 to 10 w/v %.

The concentration of the antibacterial agent in the mixed solution is not particularly limited as long as it is a concentration that allows formation of a mottled structure on the surface of the substrate, and is, for example, in a range of 0.1 w/v % or more and less than 2.0 w/v %, and preferably 0.1 to 1.0 w/v %.

In an embodiment, the mixed solution according to the production method of the present embodiment contains an amount of silicone in a range of 1 to 10 w/v % and an amount of antibacterial agent in a range of 0.1 to 1.0 w/v %.

By appropriately adjusting the types of silicone and antibacterial agent to be used and the concentrations of silicone and antibacterial agent in the mixed solution, the average convex width and the average concave width of the mottled structure formed on the surface of the medical device can be adjusted.

(Substrate)

The material of the substrate of the medical device is not particularly limited. Examples thereof include various polymer materials including: polyolefins or modified polyolefins such as polyethylenes, polypropylenes, and ethylene-α-olefin copolymers; polyamides; polyimides; polyurethanes; polyesters such as polyethylene terephthalate (PET), polybutylene terephthalate (PBT), polycyclohexane terephthalate, and polyethylene-2,6-naphthalate; polyvinyl chloride; polyvinylidene chloride (PVDC); fluororesins such as polytetrafluoroethylene (PTFE) and ethylene-tetrafluoroethylene copolymers (ETFEs), metals, ceramics, carbon, and composite materials thereof. The polymer material may be subjected to a stretching treatment (for example, ePTFE).

The shape of the substrate is appropriately selected according to the application of the medical device or the like, and may be, for example, a tubular shape, a sheet shape, a rod shape, or the like. The form of the substrate is not limited to a formed body prepared using the above-described material alone, and a blend formed product, an alloyed formed product, a multilayered formed product, or the like can be used. The substrate may be a single layer or may be laminated. At this time, when the substrates are laminated, the substrates of the respective layers may be the same or different.

(Coating)

The method for coating the substrate with the mixed solution is not particularly limited, and conventionally known methods such as a coating and printing method, an immersion method (dipping method, dip coating method), a spraying method, a spin coating method, and a mixed solution impregnated sponge coating method can be used.

In a preferred embodiment of the present embodiment, the method for coating the substrate with the mixed solution is an immersion method (dipping method). The immersion temperature is not particularly limited, and is, for example, in a range of 10 to 50° C., and preferably 15 to 40° C. The immersion time is not particularly limited, and is, for example, in a range of 10 seconds to 30 minutes.

In the case of forming a mottled structure on a thin and narrow inner surface of a catheter, a guide wire, an injection needle, or the like, the substrate is immersed in the mixed solution, and degassing may be performed by reducing the pressure in the system. By performing degassing under reduced pressure, the solution is quickly penetrated into the narrow inner surface, and whereby the formation of mottled structure can be promoted.

After the substrate is immersed in the mixed solution, the substrate is taken out and subjected to a drying treatment. The speed at which the substrate is pulled up is not particularly limited, and is, for example, in a range of 5 to 50 mm/sec. The drying condition (temperature, time, etc.) is not particularly limited as long as it is a condition under which the mottled structure can be formed on the surface of the substrate. Specifically, the drying temperature is preferably in a range of 20 to 150° C. The drying time is preferably in a range of 20 minutes to 2 hours, and more preferably 30 minutes to 1 hour.

The pressure condition during drying is not limited at all, and the drying may be performed under normal pressure (atmospheric pressure), or may be performed under compression or decompression.

As the drying means (apparatus), for example, an oven, a vacuum dryer, or the like can be used, but in the case of natural drying, the drying means (apparatus) is not particularly necessary.

(Other Steps)

The substrate having a mottled structure containing silicone and an antibacterial agent formed on a surface thereof by the above method can be used as it is as a medical device, but the substrate having a mottled structure formed may be washed as necessary.

The washing method is not particularly limited, and examples thereof include a method of immersing the substrate having a mottled structure in a washing solvent, and a method of showering a washing solvent on the substrate having a mottled structure. The washing solvent is not particularly limited as long as it does not dissolve the mottled structure, but water is preferable. Here, the water is preferably RO water, pure water, ion-exchanged water, or distilled water, and more preferably RO water. The drying method after washing is not particularly limited, and conventionally known methods can be used.

By the above method, a medical device having a mottled structure containing silicone and an antibacterial agent on a surface thereof can be produced.

EXAMPLES

The effects of certain embodiments of the present invention will be described using the following Examples and Comparative Examples. However, the technical scope of the present invention is not limited only to the following examples. Unless otherwise specified, the operation was performed at room temperature (25° C.). In addition, unless otherwise specified, "%" and "part" mean "mass %" and "part by mass", respectively.

(Preparation of Catheter Substrate)

Extrusion molding was performed using a polyurethane resin (manufactured by Nippon Miractran Co, Ltd.), and then annealing was performed at 100° C. for 1 hour to prepare a catheter substrate.

Example 1

Chlorhexidine acetate (manufactured by Tokyo Chemical Industry Co., Ltd.) and a crosslinked silicone prepared based on Coating Agent Preparation Example 1 described in JP S61-35870 B were dissolved at concentrations of 0.5 w/v % and 3 w/v %, respectively in ASAHIKLIN AK225 (dichloropentafluoropropane; manufactured by AGC Inc.) to prepare a mixed solution. The catheter substrate produced as described above was immersed in the mixed solution for 10 seconds using a ROBO Cylinder manufactured by IAI Corporation, pulled up at a speed of 5 mm/sec, and dried at 60° C. for 30 minutes to produce a catheter. When the produced catheter was confirmed using a laser microscope (objective lens: 150 times), a mottled structure was formed on the surface (The FIGURE).

Example 2

A catheter was produced in the same manner as in Example 1 except that rifampin (manufactured by FUJIFILM Wako Pure Chemical Corporation) was used in place of chlorhexidine acetate. When the produced catheter was confirmed using a laser microscope (objective lens: 150 times), a mottled structure was formed on the surface (the FIGURE).

Example 3

A catheter was produced in the same manner as in Example 1 except that benzalkonium heparin prepared by purifying a precipitate obtained by mixing an aqueous solution of benzalkonium chloride (manufactured by Kanto Chemical Co., Inc.) and an aqueous solution of sodium heparin (manufactured by SPL) was used in place of chlorhexidine acetate. When the produced catheter was confirmed using a laser microscope (objective lens: 150 times), a mottled structure was formed on the surface (the FIGURE).

Example 4

A catheter was produced in the same manner as in Example 1 except that minocycline hydrochloride (manufactured by FUJIFILM Wako Pure Chemical Corporation) was used in place of chlorhexidine acetate. When the produced catheter was confirmed using a laser microscope (objective lens: 150 times), a mottled structure was formed on the surface (the FIGURE).

Comparative Example 1

Chlorhexidine acetate (manufactured by Tokyo Chemical Industry Co., Ltd.) was dissolved at a concentration of 0.5 w/v % in ASAHIKLIN AK225 (manufactured by AGC Inc.) to prepare a solution. The catheter substrate produced as described above was immersed in the solution for 10 seconds using a ROBO Cylinder manufactured by IAI Corporation, pulled up at a speed of 5 mm/sec, and dried at 60° C. for 30 minutes to produce a comparative catheter. When the produced catheter was confirmed using a laser microscope (objective lens: 150 times), the surface was uniformly covered.

Comparative Example 2

A comparative catheter was produced in the same manner as in Comparative Example 1 except that rifampin (manufactured by FUJIFILM Wako Pure Chemical Corporation) was used in place of chlorhexidine acetate. When the produced catheter was confirmed using a laser microscope (objective lens: 150 times), the surface was uniformly covered.

Comparative Example 3

A comparative catheter was produced in the same manner as in Comparative Example 1 except that benzalkonium heparin prepared by purifying a precipitate obtained by mixing an aqueous solution of benzalkonium chloride (manufactured by Kanto Chemical Co., Inc.) and an aqueous solution of sodium heparin (manufactured by SPL) was used in place of chlorhexidine acetate. When the produced catheter was confirmed using a laser microscope (objective lens: 150 times), the surface was uniformly covered.

Comparative Example 4

A comparative catheter was produced in the same manner as in Comparative Example 1 except that minocycline hydrochloride (manufactured by FUJIFILM Wako Pure Chemical Corporation) was used in place of chlorhexidine acetate. When the produced catheter was confirmed using a laser microscope (objective lens: 150 times), the surface was uniformly covered.

<Evaluation>
[Puncture Resistance Evaluation]

The puncture resistance (trunk portion resistance) was measured for the catheters of Examples 1 to 4 and the comparative catheters of Comparative Examples 1 to 4. Specifically, an inner needle was incorporated into a catheter having an inner diameter of 0.8 mm and an outer diameter of 1.1 mm. A polyethylene film having a thickness of 50 μm was punctured with water dripping at an angle of 90 degrees and a speed of 30 mm/min using a small desktop tester EZ-1 manufactured by Shimadzu Corporation. A maximum resistance value after passage of 10 mm from the needle tip was measured, and the measured value was taken as the trunk portion resistance. The results are shown in Table 1.

[Antibacterial Property Evaluation]

The antibacterial property of the catheters of Examples 1 to 4 and the comparative catheters of Comparative Examples 1 to 4 was measured in accordance with JIS Z2801:2010. Specifically, *Staphylococcus aureus* was cultured at 35° C. and 90% RH for 24 hours, and then the viable cell count thereof was measured. As a control, the catheter substrate produced above was used.

The logarithmic value of the number obtained by dividing the viable cell count after culture of the catheter substrate by the viable cell count after culture of each of the catheters of Examples 1 to 4 or the comparative catheters of Comparative Examples 1 to 4 was taken as the antibacterial activity value. When the antibacterial activity value is 2.0 or more, it is determined to have an antibacterial property. The results are shown in Table 1.

[Measurement of Mottled Structure]

The surface of each of the catheters of Examples 1 to 4 produced above was observed with a laser microscope (objective lens: 150 times), and an image was captured. The captured image was analyzed with image analysis software. The convex width a of the mottled structure and the concave width b of the mottled structure were each measured at nine points in the X direction (catheter axial direction), and similarly, also in the Y direction orthogonal to the X direction, the convex width a' of the mottled structure and the concave width b' of the mottled structure were each measured at nine points. The average convex width and the average concave width were calculated by arithmetically averaging the obtained convex widths and concave widths. Since b was larger than b', the convex width a' and the concave width b' were adopted. The results are shown in Table 1.

TABLE 1

| | | Mixed solution | | | Surface structure | | Puncture resistance evaluation | Antibacterial property evaluation |
| | | Antibacterial agent | | Crosslinked silicone | Mottled structure | | | |
| | | Type | Concentration (w/v %) | Concentration (w/v %) | Type | Average convex width (μm) | Average concave width (μm) | Trunk portion resistance (N) | Antibacterial activity value |
| Example 1 | | Chlorhexidine acetate | 0.5 | 3.0 | Mottled pattern | 3.78 | 3.10 | 0.059 | 4.27 |
| Example 2 | | Rifampin | 0.5 | 3.0 | Mottled pattern | 2.62 | 1.45 | 0.064 | 4.27 |
| Example 3 | | Benzalkonium heparin | 0.5 | 3.0 | Mottled pattern | 3.49 | 3.66 | 0.070 | 4.27 |

TABLE 1-continued

| | Mixed solution | | | Surface structure | | | Puncture resistance evaluation | Antibacterial property evaluation |
|---|---|---|---|---|---|---|---|---|
| | Antibacterial agent | | Crosslinked silicone | | Mottled structure | | Trunk | Antibacterial |
| | Type | Concentration (w/v %) | Concentration (w/v %) | Type | Average convex width (μm) | Average concave width (μm) | portion resistance (N) | activity value |
| Example 4 | Minocycline hydrochloride | 0.5 | 3.0 | Mottled pattern | 2.94 | 3.34 | 0.062 | 4.27 |
| Comparative Example 1 | Chlorhexidine acetate | 0.5 | — | Uniform | — | — | 0.228 | 4.27 |
| Comparative Example 2 | Rifampin | 0.5 | — | Uniform | — | — | 0.171 | 3.04 |
| Comparative Example 3 | Benzalkonium heparin | 0.5 | — | Uniform | — | — | 0.172 | 4.27 |
| Comparative Example 4 | Minocycline hydrochloride | 0.5 | — | Uniform | — | — | 0.180 | 4.27 |

"—" in table indicates that corresponding substance is not blended.

Table 1 shows that the catheters of the Examples have an excellent sliding property, specifically, a puncture property, and exhibit an excellent antibacterial property as compared with the comparative catheters of the Comparative Examples.

What is claimed is:

1. A medical device comprising:
   a substrate; and
   a mottled structure at a surface of the substrate, the mottled structure comprising:
      a convex portion containing crosslinked silicone and an antibacterial agent, the convex portion comprising a plurality of granular projections that are randomly connected to form meandering linear bodies, and
      a concave portion at which the surface of the substrate is exposed from the crosslinked silicone and the antibacterial agent, the concave portion surrounding the convex portion so that the linear bodies are arranged in a dispersed manner.

2. The medical device according to claim 1, wherein the antibacterial agent is an organic antibacterial agent.

3. The medical device according to claim 2, wherein the organic antibacterial agent is selected from chlorhexidine acetate, rifampin, benzalkonium heparin, and minocycline hydrochloride.

4. The medical device according to claim 1, wherein an average width of the convex portion of the mottled structure is in a range of 0.1 to 10 μm, and an average width of the concave portion of the mottled structure is in a range of 0.1 to 10 μm.

5. The medical device according to claim 2, wherein an average width of the convex portion of the mottled structure is in a range of 0.1 to 10 μm, and an average width of the concave portion of the mottled structure is in a range of 0.1 to 10 μm.

6. The medical device according to claim 3, wherein an average width of the convex portion of the mottled structure is in a range of 0.1 to 10 μm, and an average width of the concave portion of the mottled structure is in a range of 0.1 to 10 μm.

7. A method for producing the medical device according to claim 1, the method comprising:
   providing the substrate;
   coating the substrate with a mixed solution containing the crosslinked silicone and the antibacterial agent to form the mottled structure comprising the convex portion and the convex portion.

8. The method according to claim 7, wherein the mixed solution contains an amount of the crosslinked silicone in a range of 1 to 10 w/v % and an amount of the antibacterial agent in a range of 0.1 to 1.0 w/v %.

* * * * *